(12) United States Patent
Jung et al.

(10) Patent No.: US 12,291,356 B2
(45) Date of Patent: May 6, 2025

(54) SAFE LANDING POINT SEARCH DEVICE FOR SEARCHING FOR SAFE LANDING POINT BY USING CONTOUR LINE INFORMATION WITH RESPECT TO TERRAIN MAP, AND SAFE LANDING POINT SEARCH METHOD

(71) Applicant: KOREA AEROSPACE RESEARCH INSTITUTE, Daejeon (KR)

(72) Inventors: Youeyun Jung, Daejeon (KR); Hyochoong Bang, Daejeon (KR); Seongheon Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 237 days.

(21) Appl. No.: 17/785,242

(22) PCT Filed: Mar. 19, 2020

(86) PCT No.: PCT/KR2020/003782
§ 371 (c)(1),
(2) Date: Jun. 14, 2022

(87) PCT Pub. No.: WO2021/096000
PCT Pub. Date: May 20, 2021

(65) Prior Publication Data
US 2023/0348115 A1    Nov. 2, 2023

(30) Foreign Application Priority Data
Nov. 12, 2019 (KR) .......................... 10-2019-0143976

(51) Int. Cl.
*B64G 1/62* (2006.01)
*B64G 1/66* (2006.01)

(52) U.S. Cl.
CPC ...... *B64G 1/62* (2013.01); *B64G 1/66* (2013.01)

(58) Field of Classification Search
CPC .......... B64G 1/62; B64G 1/66; G08G 5/0086; G08G 5/025; G08G 5/0021; G08G 5/0039;
(Continued)

(56) References Cited

U.S. PATENT DOCUMENTS

| 6,167,144 A | 12/2000 | Nishiguchi et al. |
| 6,216,065 B1 * | 4/2001 | Hall ........................ G01C 23/00 |
| | | 701/16 |

(Continued)

FOREIGN PATENT DOCUMENTS

| JP | 05039095 A | 2/1993 |
| JP | 11105797 A | 4/1999 |

(Continued)

OTHER PUBLICATIONS

International Search Report and Written Opinion issued in corresponding International Application No. PCT/KR2020/003782, mailed Jul. 29, 2020, 16 pages.
(Continued)

*Primary Examiner* — Wilson W Tsui
(74) *Attorney, Agent, or Firm* — Guntin & Gust, PLC; Miyoung Shin (57) ABSTRACT

A safe landing point search device for searching for a safe landing point of an unmanned exploration device that lands on and explores a celestial body, includes a terrain map obtaining unit configured to obtain a terrain map, a contour line generating unit configured to generate contour lines based on a reference minimum height value and a height interval value by using the terrain map, a largest empty circle (LEC) searching unit configured to search for one or more LECs having a radius greater than or equal to a lower-limit radius in a contour line map including the contour lines, and a safe landing point outputting unit configured to output a
(Continued)

safe landing point having a largest radius among the one or more LECs and transmit the safe landing point to the unmanned exploration device.

4 Claims, 10 Drawing Sheets

(58) Field of Classification Search
CPC ........ G08G 5/0026; G08G 5/02; G08G 5/045; B64C 39/024; B64U 2201/10; B64U 70/00

See application file for complete search history.

(56) References Cited

U.S. PATENT DOCUMENTS

| | | | |
|---|---|---|---|
| 10,029,804 B1* | 7/2018 | Chamberlain | ............ G06T 7/60 |
| 2008/0023587 A1 | 1/2008 | Head et al. | |
| 2017/0162061 A1* | 6/2017 | Srivastav | ............. G08G 5/0021 |
| 2019/0002122 A1* | 1/2019 | Ding | .................... G08G 5/0034 |
| 2019/0248487 A1* | 8/2019 | Holtz | ................... G06V 10/764 |
| 2022/0024582 A1* | 1/2022 | Nakazawa | ............... G08G 5/02 |

FOREIGN PATENT DOCUMENTS

| | | |
|---|---|---|
| KR | 1020130133480 A | 12/2013 |
| KR | 1020160112080 A | 9/2016 |

OTHER PUBLICATIONS

Jung et al., Digital Terrain Map Based Safe Landing Site Selection for Planetary Landing, IEEE Transactions on Aerospace and Electronic System, Apr. 2019, pp. 368-380, vol. 56 (1).

Grant of Patent issued in corresponding Korean Application No. 10-2019-0143976, issued Nov. 26, 2020, 6 pages, and an English translation thereof, 2 pages.

* cited by examiner

| Parameters | Values |
| --- | --- |
| Lander's diameter | 4.0m |
| Touchdown position error | 1.0m |
| Slope threshold | 5.0deg |
| Field of view | 30deg |
| Measuring altitude | 150m |
| Margin | 1m |
| Number of measurements | 400×400 |
| Small hazard distribution | 1% |
| Steep slope distribution | 55% | young
SAFE LANDING POINT SEARCH DEVICE FOR SEARCHING FOR SAFE LANDING POINT BY USING CONTOUR LINE INFORMATION WITH RESPECT TO TERRAIN MAP, AND SAFE LANDING POINT SEARCH METHOD

TECHNICAL FIELD

An embodiment of the present disclosure relates to a safe landing point search device for searching for a safe landing point by using contour line information with respect to a terrain map, and a safe landing point search method, in which contour lines are generated using a terrain map based on a triangulated irregular network and a safe landing point is searched for based on the generated contour lines.

BACKGROUND ART

Generally, existing examples of a method of landing an unmanned aerial vehicle include a landing method based on control by an external pilot, a landing method using a parachute or net, an automatic landing method using an instrument landing system (ILS) or a radar, etc.

However, such landing methods may consume a lot of money in maintaining additional manpower, securing facilities, installing equipment, etc., and may be easily exposed to a disturbance problem due to wave disturbance.

To compensate for these problems, an image-based automatic landing method using a camera has been studied, which plans a route to a moving target through a series of processes of acquiring a marker image of a landing point by the camera, separating the marker image through filtering, recognizing a marker by applying threshold values such as contrast, chrominance, the number of pixels, etc., and tracking movement of the target while removing white noise using the filter.

However, according to an image-based system described above, as two-dimensional (2D) information, which is a vector on an xy plane, is acquired, position and altitude information have to be corrected in real time using additional sensor values, such as values of a global positioning system (GPS), an inertial sensor, a laser sensor, etc., increasing processing complexity and delaying processing time.

Moreover, in the past, there is a limitation in guiding a flight vehicle to a moving landing point, and that is, for a fixed landing point, flight vehicle guidance is performed after GPS information of the landing point is previously acquired, but for a landing point having mobility, the position of the landing point has to be delivered to the flight vehicle in real time.

Furthermore, in this case, all image processing has to be performed in real time during tracking of a landing target in the landing point, and due to the absence of information about distortion of the target, recognition algorithm and operation corresponding thereto need to be additionally performed, occupying a large part of image processing time, and recognition of the moving target and delivery of corresponding flight posture information are very weak, delaying immediate reaction of the flight vehicle and causing various accidents.

(Patent Document 0001)

Korean Registered Patent Gazette No. 10-1008259

DESCRIPTION OF EMBODIMENTS

Technical Problem

The technical task to be achieved by the current embodiment is in accordance with the above-mentioned necessity, and provides a safe landing point search device for searching for a safe landing point by using contour line information with respect to a terrain map and a safe landing point searching method.

Solution to Problem

According to embodiments of the present disclosure, a safe landing point search device for searching for a safe landing point of an unmanned exploration device that lands on and explores a celestial body, includes a terrain map obtaining unit configured to obtain a terrain map, a contour line generating unit configured to generate contour lines based on a reference minimum height value and a height interval value by using the terrain map, a largest empty circle (LEC) searching unit configured to search for one or more LECs having a radius greater than or equal to a lower-limit radius in a contour line map including the contour lines, and a safe landing point outputting unit configured to output a safe landing point having a largest radius among the one or more LECs and transmit the safe landing point to the unmanned exploration device.

According to the current embodiment, the safe landing point search device may further include a fine contour generating unit configured to generate a fine contour of the celestial body by generating a first contour line group including contour lines generated by applying the height interval value to first reference minimum height values different from the reference minimum height values, in which the LEC searching unit is further configured to search for LECs having a radius greater than or equal to the lower-limit radius from the first contour line group.

The lower-limit radius may be calculated based on a preset threshold height and a slope threshold value.

According to embodiments of the present disclosure, a safe landing point search method of searching for a safe landing point of an unmanned exploration device that lands on and explores a celestial body, includes obtaining, by a safe landing point search device, a terrain map, generating, by the safe landing point search device, contour lines based on a reference minimum height value and a height interval value by using the terrain map, searching for, by the safe landing point search device, one or more largest empty circles (LECs) having a radius greater than or equal to a lower-limit radius in a contour line map including the contour lines, and outputting, by the safe landing point search device, a safe landing point having a largest radius among the one or more LECs and transmitting the safe landing point to the unmanned exploration device.

According to the current embodiment, the safe landing point search method may further include, after the generating of the contour lines, generating a first contour line group including contour lines generated by applying the height interval value to first reference minimum height values different from the reference minimum height values, and generating a fine contour of the celestial body using the first contour line group, in which the searching for of the LEC includes searching for LECs having a radius greater than or equal to the lower-limit radius from the first contour line group.

A computer program according to an embodiment of the present disclosure may be stored in a medium to execute any one method of a safe landing point search method according to an embodiment of the present disclosure by using a computer.

In addition, another method and another system for implementing the present disclosure, and a computer-readable recording medium for recording a computer program for executing the method may be further provided.

Other aspects, features, advantages, and advantages other than those described above will become apparent from the following figures, claims, and the detailed description of the disclosure.

Advantageous Effects of Disclosure

According to the present disclosure, a safe landing point may be searched for by using contour line information with respect to a terrain map.

BEST MODE

The present disclosure may have various modifications thereto and various embodiments, and thus particular embodiments will be illustrated in the drawings and described in detail in a detailed description. Effects and features of the present disclosure, and a method of achieving them will be apparent with reference to the embodiments described in detail in conjunction with the drawings. However, the present disclosure is not limited to the embodiments disclosed below, but may be implemented in various forms.

The term "include", "may include", or the like used in various embodiments of the present disclosure is to indicate the presence of functions, operations, elements, etc., disclosed therein, and does not preclude the presence or addition of one or more functions, operations, elements, etc. Moreover, it should be understood that the term "include", "have", or the like used in various embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

In various embodiments of the present disclosure, the expression "or", etc. includes any one and all combinations of the associated listed items. For example, the expression "A or B" may include A, may include B, or may include both A and B.

While expressions such as "first" and "second", as used in various embodiments of the present disclosure may modify various elements of the present disclosure, such elements are not limited by the above expressions. For example, the above expressions do not limit the sequence and/or importance of the corresponding elements. The expressions may be used for distinguishing one element from another element. For example, both a first user device and a second user device may be user devices and represent different user devices. For example, a first element may be referred to as a second element and likewise, a second element may also be referred to as a first element, without departing from the teaching of various embodiments of the present disclosure.

When an element is referred to as being "connected" or "accessed" to or by any other element, it should be understood that the element may be directly connected or accessed by the other element, but another new element may also be interposed between the element and the other element. Contrarily, when an element is referred to as being "directly connected" or "directly accessed" to or by any other element, it should be understood that there is no new another element between the element and the other element.

In an embodiment of the present disclosure, the term such as "module", "unit", "part", etc., indicates an element for processing at least one function or operation, and may be implemented in hardware, software, or in a combination of hardware and software. A plurality of "modules", "units", "parts", etc., may be integrated into at least one module or chip and implemented as at least one processor except that each of them needs to be implemented as individual specific hardware.

The terms used in various embodiments of the present disclosure are for the purpose of describing the particular embodiments only and are not intended to limit the various embodiments. Singular forms include plural forms unless apparently indicated otherwise contextually.

All of the terms used herein including technical or scientific terms have the same meanings as those generally understood by those of ordinary skill in the art of various embodiments of the present disclosure, unless they are defined other.

The terms defined in a generally used dictionary should be interpreted as having the same meanings as the contextual meanings of the relevant technology and should not be interpreted as having ideal or exaggerated meanings unless they are clearly defined in the various exemplary embodiments of the present disclosure.

Hereinafter, various embodiments of the present disclosure will be described in detail with reference to the accompanying drawings.

Figure 1:
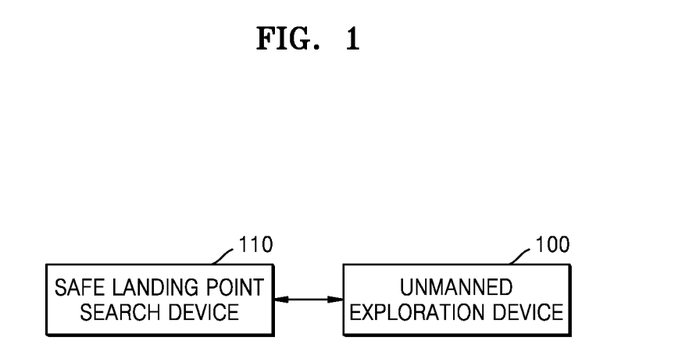
FIG. 1 is a diagram for describing a connection relationship between a safe landing point search device according to embodiments of the present disclosure and an unmanned exploration device electrically connected thereto.

FIG. 1 is a diagram for describing a connection relationship between a safe landing point search device 110 according to embodiments of the present disclosure and an unmanned exploration device 100 electrically connected thereto.

The unmanned exploration device 100 may refer to a spacecraft designed to explore outer space and land on a celestial body. The unmanned exploration device 100 may be implemented to safely land on a target point and explore the celestial body. The unmanned exploration device 100 may be designed to be manned or unmanned and implemented to move in outer space and on the celestial body according to its own algorithm.

The unmanned exploration device 100 may include the safe landing point search device 110 that searches for a safe landing point or area when landing on the celestial body, etc. The unmanned exploration device 100 may safely land on the celestial body by using the safe landing point search device 110 that detects a real-time hazard. More specifically, the unmanned exploration device 100 may land on a safe landing point that is geographically safe through the safe landing point search device 110.

The safe landing point search device 110 may calculate a safe landing point by sensing various types of rocks and slopes. The safe landing point search device 110 may recognize a terrain around a preset target point in real time to calculate the safe landing point. The safe landing point search device 110 may recognize a valley, or a terrain with a steep slope as a dangerous place.

The unmanned exploration device 100 may be designed to receive the safe landing point from the safe landing point search device 110 and land on the safe landing point.

The safe landing point search device 110 may search for the safe landing point merely with a simple operation using a contour line or level. The safe landing point search device 110 may search for the safe landing point by using a two-dimensional (2D) contour line map. The safe landing point search device 110 may generate contour line information based on a terrain map and search for the safe landing point based on a distance between contour lines and terrain information recognized based on the contour lines.

The safe landing point search device 110 may execute instructions of elements by using one or more processors. More specifically, the safe landing point search device 110 may search for the safe landing point by using information sensed by a sensor unit as well as the terrain information recognized based on the terrain map. The safe landing point search device 110 may in more detail recognize surrounding terrain information by using a laser, etc., and search for the safe landing point based on the recognized surrounding terrain information. The safe landing point search device 110 may search for the safe landing point by using the terrain map, the sensor unit, the laser, etc., and search for the safe landing point by using a terrain map obtained by various means without being limited thereto.

Figure 2:
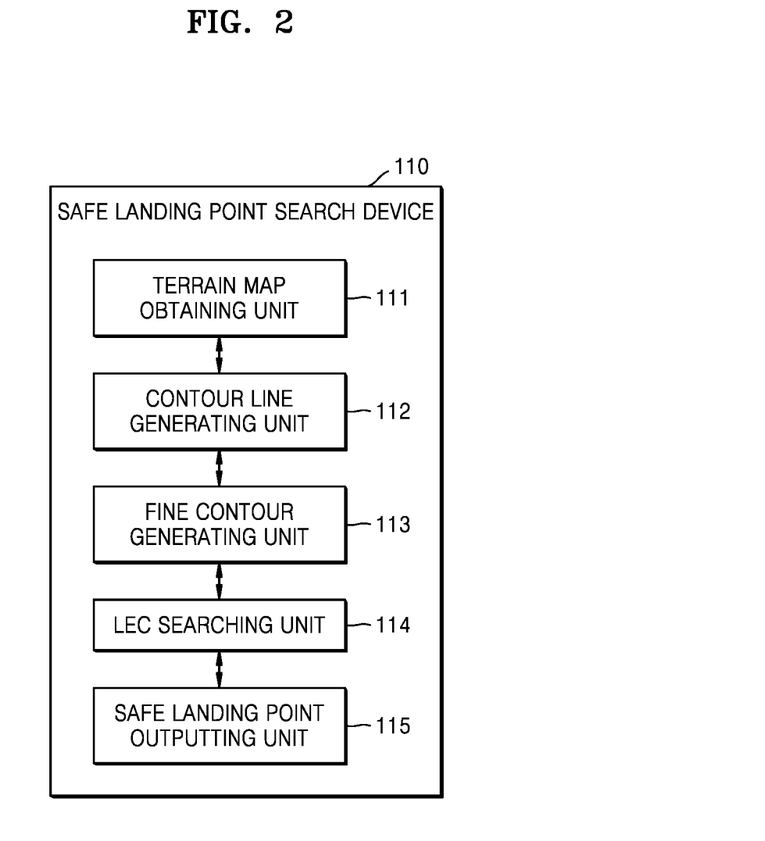
FIG. 2 is a block diagram of a safe landing point search device according to embodiments of the present disclosure.

FIG. 2 is a block diagram of the safe landing point search device 110 according to embodiments of the present disclosure.

As shown in FIG. 2, the safe landing point search device 110 may include a terrain map obtaining unit 111, a contour line generating unit 112, a fine contour generating unit 113, a largest empty circle (LEC) searching unit 114, and a safe landing point outputting unit 115.

The terrain map obtaining unit 111 may obtain a digital terrain map. The terrain map obtaining unit 111 may obtain a digital terrain map generated in place of a light detection and ranging (LIDAR) measurement-based triangulated irregular network (TIN)-digital elevation map (DEM) or a raster grid-based DEM. Herein, the TIN may obtain an accurate terrain map as one of the most widely used geographical methods in a three-dimensional (3D) geographic information system.

The contour line generating unit 112 may generate contour lines that connect points having the same height in the obtained terrain map. In this case, height values that draw a contour line may have a regular interval. For example, a contour line of a preset reference minimum height and contour lines of heights obtained by adding a preset height interval to the reference minimum height may be generated using the terrain map. Herein, the height interval may be set to a value equal to a threshold height corresponding to a slope where safe landing is possible. When the height interval is set equal to the threshold height, points where safe landing is possible may be expressed intuitively.

The fine contour generating unit 113 may generate a plurality of contour line groups by applying a plurality of criteria. For example, a contour line group may include a first contour line group drawn based on a first criterion and a second contour line group drawn based on a second criterion. The first criterion and the second criterion may be determined using a reference minimum height value, a reference maximum height value, a height interval value, and a minimum interval value, and values applied to the respective criteria may vary.

For example, when the reference minimum height value is 0 m, the reference maximum height value is 1 m, the height interval value is 0.3 m, and the minimum interval value is 0.05 m, the first contour line group drawn based on the first criterion may include contours with heights of (0 m, 0.3 m, 0.6 m, 0.9 m). The second contour line group may include contours with heights of (0.05 m, 0.35 m, 0.65 m, 0.95 m). In addition, as many contour line groups as a value obtained by dividing the height interval value by the minimum interval value (0.3/0.05=6) may be generated. That is, the first contour line group may include contour lines having a height of 0 m. The second contour line group may include contour lines having a height of 0.05 m. A third contour line group may include contour lines having heights of 0.1 m, 0.3 m, 0.7 m, and 1 m. A fourth contour line group may include contour lines of heights of 0.15 m, 0.45 m, and 0.75 m. A fifth contour line group may include contour lines of heights of 0.2 m, 0.5 m, and 0.8 m. A sixth contour line group may include contour lines of 0.25 m, 0.55 m, and 0.85 m height.

Figure 6:
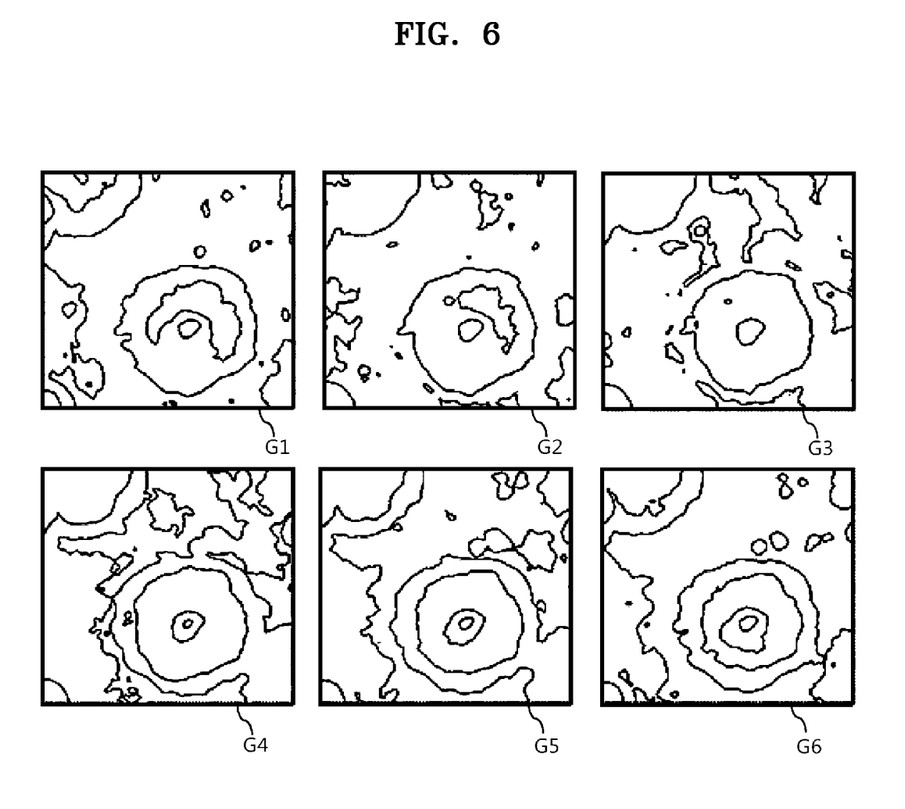
FIG. 6 is an example view of contour line groups generated by a safe landing point search device.

The fine contour generating unit 113 may generate fine contour information by using a plurality of contour line groups generated in the foregoing manner. The fine contour generating unit 113 may output contour line information G1, G2, G3, G4, G5, and G6 to which different criteria are applied as shown in FIG. 6.

Figure 5:
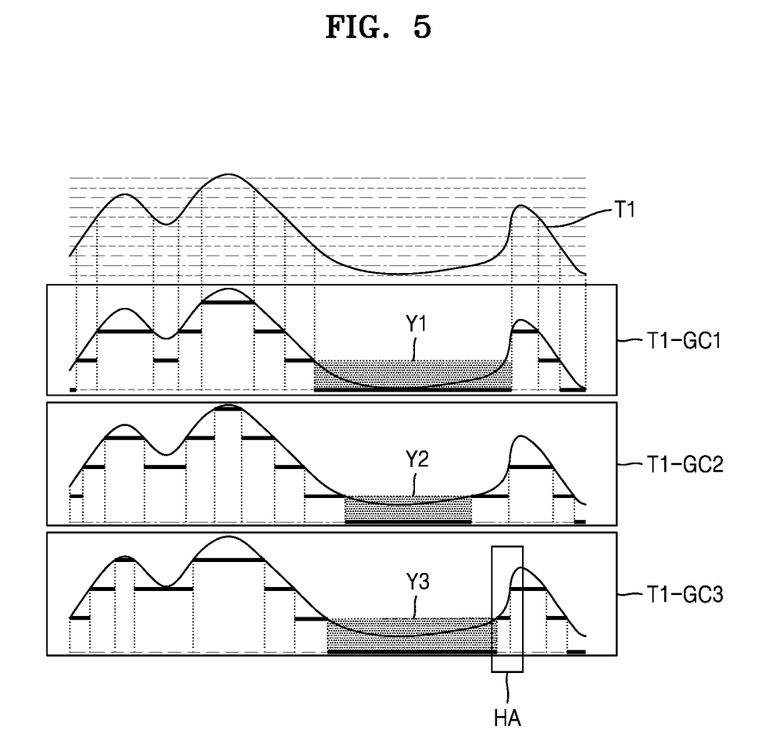
FIG. 5 is a view for describing contour line groups obtained from one terrain.

The fine contour generating unit 113 may generate contour line groups T1-GC1, T1-GC2, and T1-GC3 in one terrain map T1, as shown in FIG. 5. Based on a red line in the terrain map T1, an area corresponding to the first reference minimum height value may be a first yellow area Y1. The first reference minimum height value refers to the smallest height value among contour lines generated by applying the first reference. Based on a blue dash-dotted line in the terrain map T1, an area corresponding to the second reference minimum height value may be a second yellow area Y2 that is narrower than the first yellow area Y1 in the contour line group T1-GC1. Based on a green dotted line in the terrain map T1, an area corresponding to a third reference minimum height value may be a third yellow area Y3 that is narrower than the first yellow area Y1 and broader than the second yellow area Y2. The fine contour generating unit 113 may generate the contour line groups T1-GC1, T1-GC2, and T1-GC3.

The LEC searching unit 114 may detect one or more LECs having a radius greater than a lower-limit radius that is preset in a contour line map obtained through the contour line generating unit 112 or the fine contour generating unit 113. Here, the contour map refers to a map including contour lines belonging to each contour line group. The lower-limit radius may be calculated using a slope threshold value. The slope threshold value may refer to a slope value with respect to a threshold height that enables safe landing, and will be described with reference to FIG. 4.

Figure 4:
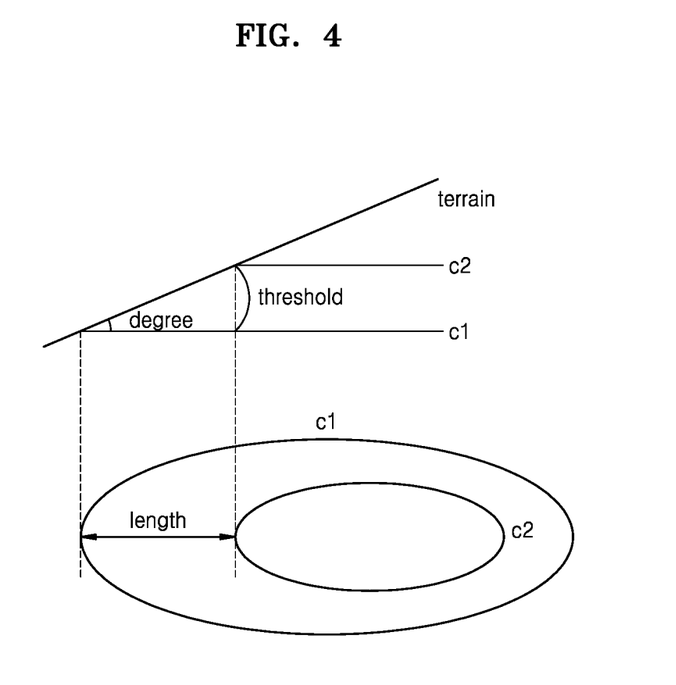
FIG. 4 is a view for describing a process of calculating a lower-limit radius.

As shown in FIG. 4, when the threshold height (threshold) and the slope threshold value (degree) are set in a statistical manner, the lower-limit radius (length) may be calculated as threshold/tan (degree). When the threshold is 0.3 m and the degree is 5°, the lower-limit radius (length) may be about 0.3429 m as 0.3/tan(5°). In the contour line map generated through the fine contour generating unit 113, it is determined that there is no contour line at 0.3429 m corresponding to the lower-limit radius, that point may be detected as an LEC.

The LEC searching unit 114 may search for an LEC in each of a plurality of contour line maps through a plurality of contour line groups.

The safe landing point outputting unit 115 may output a center of an LEC having the largest radius among the detected one or more LECs.

The safe landing point outputting unit 115 may detect a steep area (HA of FIG. 5) through the plurality of contour line groups (T1-GC1, T1-GC2, and T1-GC3 of FIG. 5). The steep area HA may refer to an area where an interval between contour lines is narrower than the lower-limit radius. The safe landing point outputting unit 115 may detect steep areas from contour line groups and output an LEC having no steep area as a safe landing point.

Figure 7:
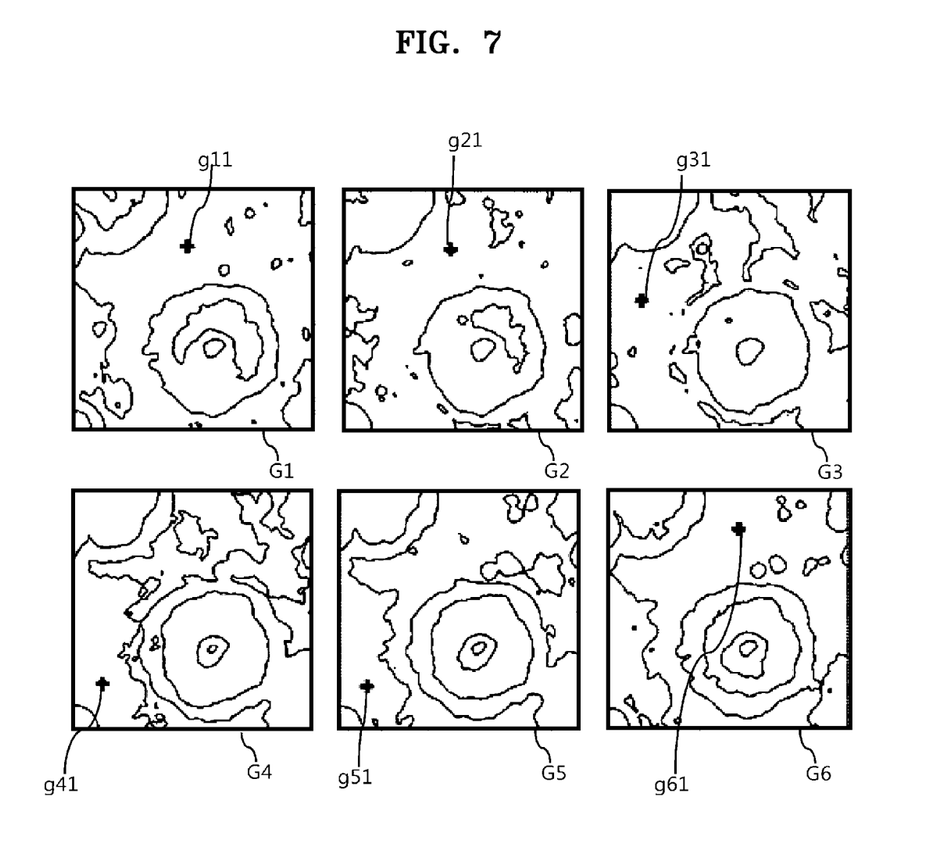
FIG. 7 is an example view showing largest empty circles (LECs) included in contour line groups.
Figure 8:
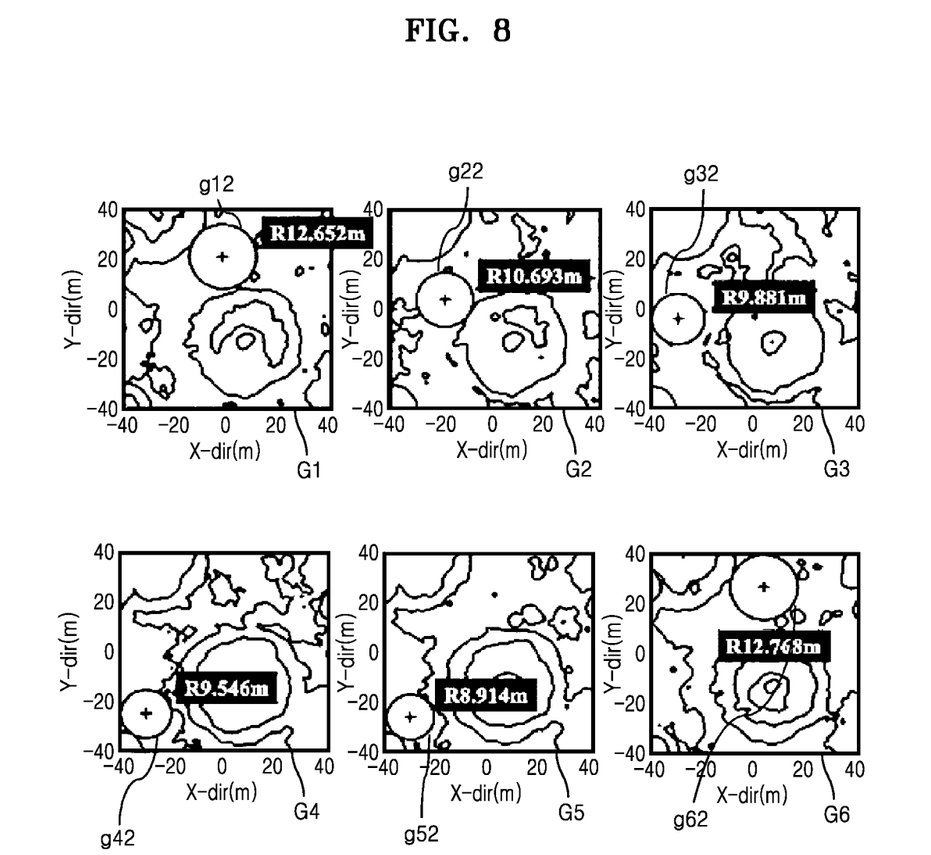
FIG. 8 is an example view showing radius information of LECs included in contour line groups.

As shown in FIG. 7, the LEC searching unit 114 may search for LECs having the largest radii, like g11, g21, g31, g41, g51, and g61 from the contour line groups G1, G2, G3, G4, G5, and G6, respectively, and the safe landing point outputting unit 115 may measure radius information of g11, g21, g31, g41, g51, and g61 with lengths to contour lines adjacent thereto, like g12, g22, g32, g42, g52, and g62, and output g62 having the largest radius as the safe landing point.

Figure 9:
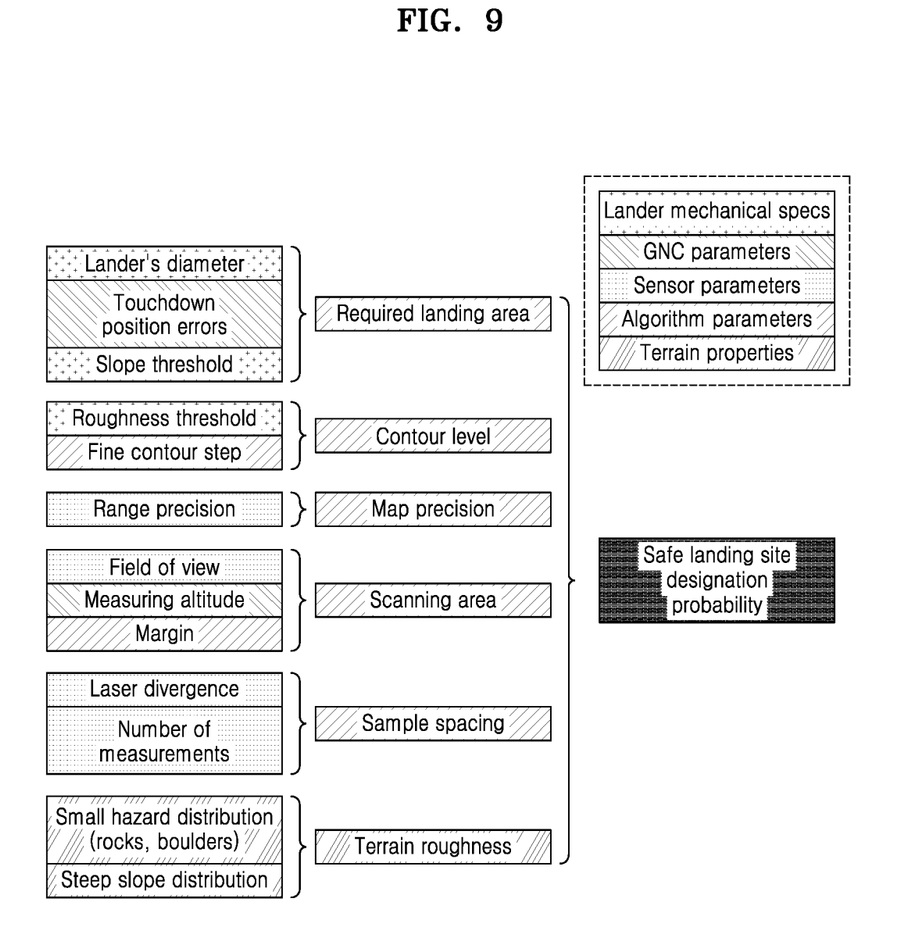
FIG. 9 is a view for describing parameters applied to a safe landing point search device.

In another embodiment, the safe landing point outputting unit 115 may determine the safe landing point by further considering parameters shown in FIG. 9.

The parameters used to determine the safe landing point may include:

Lander's diameter, touchdown position errors, and slope threshold related to a landing area Roughness threshold and fine contour step related to a contour level Range precision related to map precision Field of view, measuring altitude, and margin related to a scanning area Laser divergence and number of measurements related to sample spacing Small hazard distribution and steep slope distribution related to terrain roughness Small hazard distribution $P_{sh}$ may be defined as $$\frac{n_{sh}}{N_P}.$$

$n_{sh}$ refers to the number of small hazards, and $N_P$ refers to a total number of measured points.

Steep slope distribution $P_{ss}$ may be defined as $$\frac{n_{ss}}{N_P}.$$

$n_{ss}$ refers to the number of points adjacent to a steep slope in the TIN.

Figure 10:
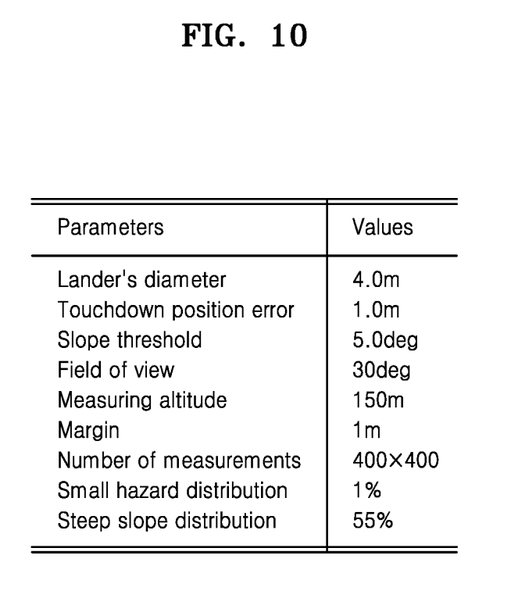
FIG. 10 is a view showing parameters actually designed in a safe landing point search device.

The parameters shown in FIG. 9 may be defined as shown in FIG. 10 for use in searching for a safe landing point.

Figure 3:
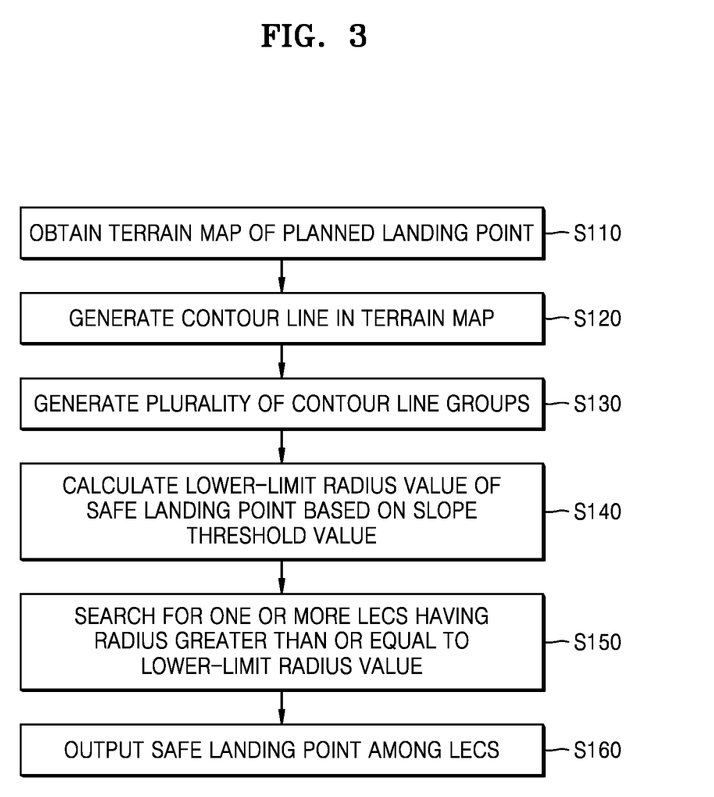
FIG. 3 is a flowchart of a safe landing point search method according to embodiments of the present disclosure.

FIG. 3 is a flowchart of a safe landing point search method according to embodiments of the present disclosure.

As shown in FIG. 8, in operation S110, the safe landing point search device 110 may obtain a terrain map of a planned landing point. The safe landing point search device 110 may obtain a digital terrain map generated based on a LIDAR measurement-based TIN-DEM or a raster grid-based DEM.

In operation S120, the safe landing point search device 100 may generate contour lines that connect points having the same height in the terrain map. In this case, height values that draw a contour line may have a regular interval. A contour line of a preset reference minimum height value and contour lines of heights obtained by adding a preset height interval value to a reference minimum height value may be generated using the terrain map.

In operation S130, the safe landing point search device 100 may generate a plurality of contour line groups based on the reference minimum height value, the reference maximum height value, the height interval value, and the minimum interval value. Herein, the reference minimum height value may refer to the height value of a contour line having the lowest height among expressed contour lines. The reference maximum height value may refer to the maximum height value of the expressed contour lines. The height interval value regarding the height interval of the expressed contour lines may be preset.

In this case, the number of contour line groups may be based on a height interval value/a minimum interval value, e.g., for 0.3 m/0.05 m, the number of contour line groups may be 6.

Determination of a safe landing point may be largely affected by the reference minimum height value, and by generating a plurality of contour line groups, a contour line map with different reference minimum height values may be generated, and the safe landing point with a lower-limit radius or more from the minimum height value may be detected.

In operation S140, the safe landing point search device 100 may calculate the lower-limit radius value of the safe landing point based on a slope threshold value. As shown in FIG. 4, when the threshold height (threshold) and the slope threshold value (degree) are set in a statistical manner, the safe landing point search device 100 may calculate the lower-limit radius (length) as threshold/tan (degree). When the threshold is 0.3 m and the degree is 5°, the lower-limit radius (length) may be about 0.3429 m as) 0.3/tan(5°). In the contour line map generated through the fine contour generating unit 113, it is determined that there is no contour line at 0.3429 m corresponding to the lower-limit radius, that point may be detected as an LEC.

In operation S150, the safe landing point search device 100 may search for an LEC from each of the plurality of contour line maps through the plurality of contour line groups.

In operation S160, the safe landing point search device 100 may output a center of an LEC having the largest radius among detected one or more LECs.

The device described above may be implemented by a hardware element, a software element, and/or a combination of the hardware element and the software element. For example, the device and elements described in the embodiments may be implemented using one or more general-purpose or special-purpose computers such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications running on the OS. The processing device may access, store, manipulate, process, and generate data in response to execution of software. For convenience of understanding, it is described that one processing device is used, but those of ordinary skill in the art would recognize that the processing device includes a plurality of processing elements and/or a plurality of types of processing elements. For example, the processing device may include a plurality of processors or one processor and one controller. Alternatively, other processing configurations such as parallel processors may be possible.

Software may include a computer program, a code, an instruction, or a combination of one or more thereof, and may configure a processing device to operate as desired or independently or collectively instruct the processing device. The software and/or data may be permanently or temporarily embedded in any type of machine, component, physical device, virtual equipment, computer storage medium or device, or signal wave to be transmitted, so as to be interpreted by or to provide instructions or data to the processing device. The software may be distributed over computer systems connected through a network and may be stored or executed in a distributed manner. The software and data may be stored in one or more computer-readable recording media.

The method according to the embodiments may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM), flash memory, etc. Examples of the program command may include not only a machine language code created by a complier, but also a high-level language code executable by a computer using an interpreter. The foregoing hardware device may be configured to be operated as at least one software module to perform an operation of the embodiments, or vice versa.

While embodiments of the disclosure have been described by the limited embodiments of the disclosure and drawings, various modifications and changes may be made from the disclosure by those of ordinary skill in the art. For example, even when described techniques are performed in a sequence different from the described method and/or components such as systems, structures, devices, circuits, etc. are combined or connected differently from the described method, or replaced with other components or equivalents, an appropriate result may be achieved.

Therefore, other implementations, other embodiments, and equivalents to the claims may also fall within the scope of the claims provided below.

The invention claimed is:

1. A landing method of an unmanned exploration device comprising:
    executing, by a safe landing point search device having a processor, operations for searching a safe landing point in a scanning area of an unmanned exploration device, wherein the operations comprise:
        obtaining, by the safe landing point search device, a terrain map of a planned landing point;
        generating, by the safe landing point search device, a plurality of contour lines in the obtained terrain map, wherein each of the plurality of contour lines connects points having a same height in the obtained terrain map and represents a height different from other contour lines, and
        wherein the plurality of contour lines comprises a first number (L) of contour line groups based on predetermined criteria, wherein the predetermined criteria include a reference minimum height value, a reference maximum height value, a preset minimum interval value, and a preset height interval value, by using the obtained terrain map, wherein the first number (L) of contour line groups is determined by dividing the preset height interval value by the preset minimum value, and the preset height interval value is set equal to a threshold height enabling safe landing; and
        wherein each of the first number (L) of contour line groups includes a second number (M) of contour lines, separated by the preset height interval value, between the reference minimum height value and the reference maximum height value, and each height of the second number (M) of contour lines in each of the first number (L) of contour line groups does not overlap;
        generating, by the safe landing point search device, the first number (L) of contour line maps, wherein each contour line map includes the second number (M) of contour lines belonging to each of the first number (L) of contour line groups and represents terrain conditions at different heights corresponding to a respective contour line of the second number (M) of contour lines; and
        detecting, by the safe landing point search device, a largest empty circle (LEC) having a radius greater than or equal to a lower-limit radius in each of the first number (L) contour line maps, wherein the lower-limit radius is determined using the threshold height enabling safe landing; and
    determining, by the safe landing point search device, a real-time hazard by using surrounding terrain information obtained from at least the terrain map, a sensor unit and a laser;
    determining, by the safe landing point search device, the safe landing point in the planned landing point based on a largest radius among the first number (L) of LECs and a plurality of parameters including a diameter of the unmanned exploration device, field of view, measuring altitude, and margin related to the scanning area, and the real-time hazard;
    outputting, by the safe landing point search device, the safe landing point having no real-time hazard and transmitting the safe landing point to the unmanned exploration device; and enabling, by the safe landing point search device, landing of the unmanned exploration device on the safe landing point that is geographically safe and includes no valley or steep slope.

2. The landing method of claim 1, wherein the lower-limit radius is calculated by using a slope threshold value with respect to the threshold height that enables safe landing.

3. A non-transitory computer-readable recording medium storing therein an operating program that causes a safe landing point search device having a processor to execute a process comprising:

executing operations for searching a safe landing point in a scanning area of an unmanned exploration device, wherein the operations comprise:

obtaining a terrain map of a planned landing point;

generating a plurality of contour lines in the obtained terrain map, wherein each of the plurality of contour lines connects points having a same height in the obtained terrain map and represents a height different from other contour lines, and wherein the plurality of contour lines comprises a first number (L) of contour line groups based on predetermined criteria, wherein the predetermined criteria include a reference minimum height value, a reference maximum height value, a preset minimum interval value, and a preset height interval value by using the terrain map, wherein the first number (L) of contour line groups is determined by dividing the preset height interval value by the preset minimum interval value, and wherein the first number (L) of contour line groups include a second number (M) of contour lines, separated by the preset height interval value, between the reference minimum height value and the reference maximum height value, and each height of the second number (M) of contour lines does not overlap and the preset height interval value is set equal to a threshold height enabling safe landing;

generating the first number (L) of contour line maps, wherein each contour line map includes the second number (M) of contour lines belonging to each of the first number (L) of contour line groups and represents terrain conditions at a different height corresponding to a respective contour line of the second number (M) of contour lines; and detecting a largest empty circle (LEC) having a radius greater than or equal to a lower-limit radius in each of the first number (L) of contour line maps, wherein the lower-limit radius is determined using the threshold height enabling safe landing;

determining a real-time hazard by using surrounding terrain information obtained from at least the terrain map, a sensor unit and a laser;

determining the safe landing point in the planned landing point based on a largest radius among the first number (L) of LECs and a plurality of parameters including a diameter of the unmanned exploration device, field of view, measuring altitude, and margin related to the scanning area, and the real-time hazard;

outputting the safe landing point having no real-time hazard and transmitting the safe landing point to an unmanned exploration device; and enabling landing of the unmanned exploration device on the safe landing point that is geographically safe and includes no valley or steep slope.

4. The non-transitory computer-readable recording medium of claim 3, wherein the lower-limit radius is calculated by using a slope threshold value with respect to the threshold height that enables safe landing.

\* \* \* \* \*